United States Patent
Beatty et al.

(10) Patent No.: US 11,636,522 B2
(45) Date of Patent: Apr. 25, 2023

(54) REAL ESTATE BUYER FEEDBACK APPLICATION

(71) Applicant: CARRIER CORPORATION, Palm Beach Gardens, FL (US)

(72) Inventors: Jackson Beatty, Molalla, OR (US); Jan Phillips, Salem, OR (US); Yenong Qi, Salem, OR (US); Alissa D. Doose, Farmington, CT (US); Tom Hill, Salem, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 150 days.

(21) Appl. No.: 16/613,267

(22) PCT Filed: Apr. 19, 2018

(86) PCT No.: PCT/US2018/028279
§ 371 (c)(1),
(2) Date: Nov. 13, 2019

(87) PCT Pub. No.: WO2018/212897
PCT Pub. Date: Nov. 22, 2018

(65) Prior Publication Data
US 2020/0143434 A1 May 7, 2020

Related U.S. Application Data

(60) Provisional application No. 62/507,011, filed on May 16, 2017.

(51) Int. Cl.
*G06Q 30/00* (2012.01)
*G06Q 30/02* (2023.01)
(Continued)

(52) U.S. Cl.
CPC ..... *G06Q 30/0281* (2013.01); *G06Q 30/0617* (2013.01); *G06Q 30/0625* (2013.01); *G06Q 50/16* (2013.01)

(58) Field of Classification Search
CPC ........... G06Q 30/0281; G06Q 30/0617; G06Q 30/0625; G06Q 50/16
See application file for complete search history.

(56) References Cited

U.S. PATENT DOCUMENTS 8,532,636 B2   9/2013   Rao
9,128,471 B1   9/2015   Shahid et al.
(Continued)

FOREIGN PATENT DOCUMENTS

CA        2740905 A1    11/2012

OTHER PUBLICATIONS

International Search Report dated Jul. 6, 2018 issued for PCT/US2018/028279.
http://www.showingsuite.com/features/homefeedback/.

*Primary Examiner* — Raquel Alvarez
(74) *Attorney, Agent, or Firm* — Bachman & LaPointe, P.C.

(57) ABSTRACT

A method to provide feedback associated with a real estate listing including providing access to a real estate listing via a system including at least a listing recommendation server that communicates with a real estate feedback application. Then receiving feedback regarding the real estate listing from a handheld device operating the real estate feedback application. Then sharing the feedback with a showing agent associated with the real estate listing.

30 Claims, 8 Drawing Sheets

(51) Int. Cl.
    *G06Q 30/0601*    (2023.01)
    *G06Q 50/16*     (2012.01)

(56) References Cited

U.S. PATENT DOCUMENTS

| | | |
|---|---|---|
| 9,208,466 B2 | 12/2015 | Fisher |
| 2002/0046077 A1 | 4/2002 | Mozayeny et al. |
| 2003/0220807 A1 | 11/2003 | Hoffman et al. |
| 2006/0106628 A1 | 5/2006 | Faherty et al. |
| 2007/0226046 A1 | 9/2007 | Share |
| 2007/0260465 A1 | 11/2007 | Cook |
| 2009/0030718 A1 | 1/2009 | Bengson |
| 2013/0030872 A1 | 1/2013 | Oksman |
| 2013/0282524 A1 | 10/2013 | Appolito et al. |
| 2014/0222512 A1 | 8/2014 | Pace |
| 2014/0304178 A1* | 10/2014 | Bengson ............... H04W 4/021 |
| | | 705/313 |
| 2015/0242919 A1 | 8/2015 | Wickam |
| 2016/0307242 A1* | 10/2016 | Kuhlmann ......... G06Q 30/0278 |

* cited by examiner

REAL ESTATE BUYER FEEDBACK APPLICATION

BACKGROUND

The present disclosure relates generally to a real estate buyer feedback system, and more particularly, to a system and method to communicate feedback from a buyer to listing agents and sellers.

In the real estate industry, there exists significant activity relating to the sale of a home that is decoupled from the listing agent's knowledge. The listing agent must often, at the seller's behest, contact the showing agent to receive feedback as to the buyer's perspective on the home. This can be a time-consuming practice and can lead to seller frustration in understanding what actions may facilitate sale of their home from the perspective of the buyer who views their home. Additionally, from the buyer's perspective, the buyer has to manage their numerous home viewing experiences.

SUMMARY

A method to provide feedback associated with a real estate listing according to one disclosed non-limiting embodiment of the present disclosure includes providing access to a real estate listing via a system including at least a listing recommendation server that communicates with a real estate feedback application; receiving feedback regarding the real estate listing from a handheld device operating the real estate feedback application; and sharing the feedback with a showing agent associated with the real estate listing.

A further aspect of the present disclosure includes, wherein the providing access to the real estate listing is selectively provided in response to direction from the showing agent associated with the real estate listing.

A further aspect of the present disclosure includes, wherein the receiving feedback regarding the real estate listing includes receiving at least one of a picture, a video, and a note from the handheld device running the real estate feedback application.

A further aspect of the present disclosure includes, wherein the receiving feedback regarding the real estate listing includes receiving a rating from the handheld device operating the real estate feedback application.

A further aspect of the present disclosure includes, wherein the rating is provided as a scale rating.

A further aspect of the present disclosure includes, wherein the scale rating is provided as at least one of numeric, emoji based, and color coded.

A further aspect of the present disclosure includes, wherein the scale rating is specific to particular rooms of the property.

A further aspect of the present disclosure includes, wherein the sharing the feedback with the showing agent associated with the real estate listing includes sharing the feedback to a handheld device of the showing agent via the Internet through the listing recommendation server.

A further aspect of the present disclosure includes selectively sharing the feedback from the showing agent to a handheld device of a listing agent of the property via the Internet through the listing recommendation server.

A method to provide feedback associated with a real estate listing according to one disclosed non-limiting embodiment of the present disclosure includes receiving access to a real estate listing on a real estate feedback application operating on a handheld device; recording feedback regarding the real estate listing via the real estate feedback application; and communicating the feedback from the real estate feedback application to a showing agent associated with the real estate listing via a system including at least a listing recommendation server.

A further aspect of the present disclosure includes, wherein the receiving access to the real estate listing is received from the agent associated with the real estate listing.

A further aspect of the present disclosure includes, wherein the recording feedback regarding the real estate listing includes storing a picture from the handheld device running the real estate feedback application.

A further aspect of the present disclosure includes, wherein the recording feedback regarding the real estate listing includes storing video from the handheld device running the real estate feedback application.

A further aspect of the present disclosure includes, wherein the recording feedback regarding the real estate listing includes storing a note from the handheld device running the real estate feedback application.

A further aspect of the present disclosure includes, wherein the recording feedback regarding the real estate listing includes a rating from the handheld device operating the real estate feedback application.

A further aspect of the present disclosure includes, wherein the recording feedback regarding the real estate listing includes storing feedback associated with a specific area of the property associated with the real estate listing.

A further aspect of the present disclosure includes, wherein the rating is provided as a scale rating.

A further aspect of the present disclosure includes, wherein the scale rating is provided as at least one of numeric, emoji based, and color coded.

A further aspect of the present disclosure includes, wherein the scale rating is specific to particular rooms of the property.

A further aspect of the present disclosure includes, wherein the communicating the feedback with the agent associated with the real estate listing includes communicating the feedback to a handheld device of the showing agent via the Internet thru the listing recommendation server.

A further aspect of the present disclosure includes selectively communicating the feedback from the showing agent to a handheld device of a listing agent of the property via the Internet thru the listing recommendation server.

A further aspect of the present disclosure includes, wherein the showing agent selectively defines the feedback which is communicated with the listing agent.

A further aspect of the present disclosure includes, wherein the listing recommendation server generates a report for the listing agent, the report includes at least one of a particular buyer's feedback, a particular buyer's feedback as compared to other properties, other buyer's feedback comparison for the particular property, and other buyer's feedback for other properties.

A handheld device according to one disclosed non-limiting embodiment of the present disclosure includes a processor in communication with a memory and a power supply, the processor operable to execute the executable instructions to record feedback regarding a real estate listing via the real estate feedback application, then communicating the feedback from the real estate feedback application.

A further aspect of the present disclosure includes, wherein the executable instructions include executable instruction to display the feedback as a rating scale on a display of the handheld device.

A further aspect of the present disclosure includes, wherein the recording feedback regarding the real estate listing includes storing feedback associated with a specific area of the property associated with the real estate listing in memory via the real estate feedback application, the specific area of the property determined by a GPS module in the handheld device.

A further aspect of the present disclosure includes, wherein the rating is provided as a scale rating.

A further aspect of the present disclosure includes, wherein the scale rating is displayed as at least one of numeric, emoji based, and color codes.

A further aspect of the present disclosure includes, wherein the communicating the feedback from the real estate feedback application further comprises communicating the feedback to a handheld device of a listing agent via the Internet through a listing recommendation server.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
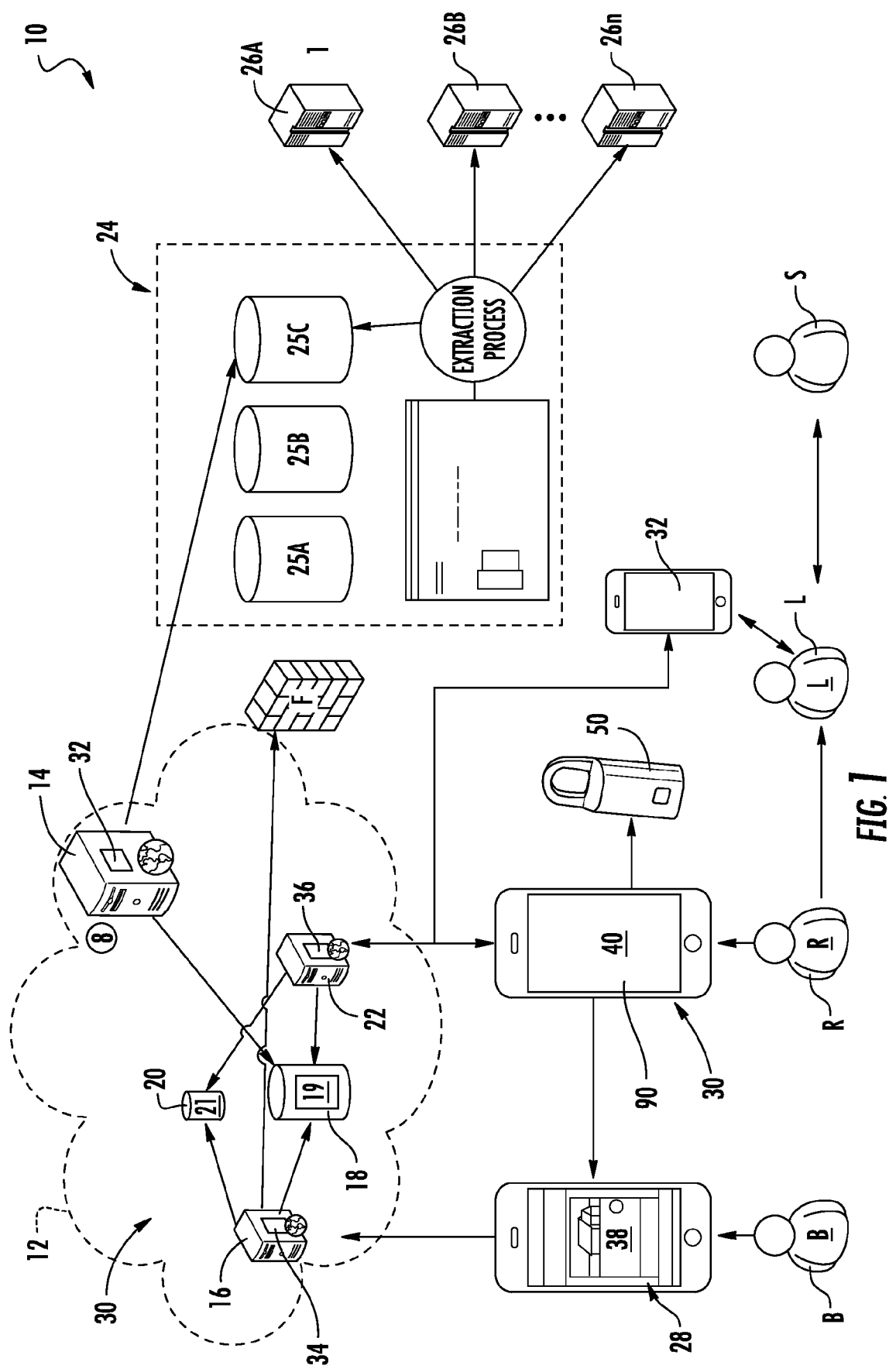
FIG. 1 is a general schematic system diagram of a real estate feedback application system.

FIG. 1 schematically illustrates a system 10 to facilitate communication for real estate transactions. A showing agent "R" has a fiduciary duty to a home buyer "B" while a listing agent "L" has a fiduciary duty to a home seller "S." The showing agent "R" typically shows the property to the home buyer "B." The listing agent "L" typically communicates with the buyer "B" only indirectly, such as by communication with the showing agent "R" who then communicates information to and from the buyer "B." Although only particular agents are referred to in the illustrated embodiments, the functions of such personnel may be otherwise assigned or rearranged. For example, the listing agent "L" may utilize a seller's assistant.

Showing information is accessible through the system 10 so that the listing agent "L" can generate reports for their seller "S", send updates about a particular listing to showing agents "R" who recently showed that listing, or provide feedback from a showing. The feedback may also include data generated by an electronic key box 50 that occurs as a function of the showings, such as number of showings, time spent at the subject property, return showings, etc. Listing agents "L" may also use the system 10 to receive automatic notification (e.g., email notices) when a showing occurs at their listings. The buyer "B" may also benefit as the system 10 provides a central repository for buyer information (e.g., details of each home the buyer has viewed).

The system 10 generally includes a subsystem 12 that may be controlled by a single owner. The subsystem 12 generally includes a listing recommendation server 14, a buyer server 16, a buyer database system 18, a log database system 20, and an electronic key server 22. A multiple of handheld devices 28, 30, 32, communicate with the subsystem 12. The first handheld device 28 is herein associated with the potential buyer "B," the second handheld device 30 is associated with the showing agent "R" and the third handheld device 32 is associated with the listing agent "L."

"Server" conveys its customary meaning and further includes a corporate datacenter that provides service and/or data connection, e.g., to the handheld device and/or an electronic locking device. "Handheld device" refers to a portable electronic device that is at least configured to send messages to, and/or receive messages from the listing recommendation server 14 over a long-range wireless communication network, such as a SMS, wireless, or cellular network. Examples of handheld devices include, but are not limited to: a cell phone; a personal digital assistant ("PDA"); a portable computer configured to store and playback digital pictures, songs, and/or videos; and the like. In addition, the handheld device is typically also configured for short-range wireless communications.

The listing recommendation server 14 communicates with the buyer database system 18, the log database system 20, and a data center 24. The buyer database system 18 includes a database 19 that stores rating and notes taken by the buyer "B," and the log database system 20 includes a database 21 that collects activity data. The data center 24 may host one or more servers that may include, but not be limited to, a database for managing key holders 25A, a security database 25B that hosts security protocols, and a listing database 25C that stores extracted real estate listings from external servers 26A, 26B, 26N.

The data center 24 communicates with the external data servers 26A-26N such as a Real Estate Transaction Standard (RETS) framework that stores MLS data. The MLS data includes information such as number of bedrooms, number of bathrooms, price of listing, etc. RETS is a framework that can be adopted by computer systems to receive data from the Multiple Listing Service (MLS) servers, as well as those of other real estate systems provided they also have software installed designed to communicate using the RETS framework. The National Association of Realtors refers to RETS as a "common language." The data center 24 may also host real estate servers including a database for managing key box inventories, a security database that houses security protocols, a listing database of property listings, and/or other databases.

The listing recommendation server 14 hosts, for example, at least an analytics software application 32 that compiles and runs analytics against buyer ratings and MLS listing data from the data center 24. The buyer server 16 hosts a buyer application program interface (API) 34, and the electronic key server 22 hosts an electronic key API 36. An application program interface (API) is a set of routines, protocols, and tools for building software applications. An API specifies how software components should interact. APIs are used when programming graphical user interface (GUI) components. A server-side web API is a programmatic interface consisting of one or more publicly exposed endpoints to a defined request-response message system The listing recommendation server 14 communicates with a real estate application 38 on the handheld device 28 through the buyer API 34 and buyer database system 18. An agent application 40 on the handheld device 30 communicates with the listing recommendation server 14 and the electronic key server 22. The buyer API 34 and the electronic key API 36 also communicate with the data center 24 through a firewall "F" or other security protocol.

The real estate application 38 may be a mobile application that may be used by the home buyer "B" to rate the properties they have seen via, for example, recordation of feedback and cataloging of the properties of interest. The real estate application 38 communicates with the buyer database system 18 through the buyer API 34 which then stores the ratings and notes taken by the home buyer in the buyer database system 18.

The agent application 40 may be a mobile application that may be used by the showing agent "R" to access the electronic key boxes 50. The electronic key API 36 communicates with the agent application 40 to sync activity from the electronic key boxes 50 to the electronic key API 36 (e.g., key boxes the key has opened), and showing notifications (e.g., messages about accessed key boxes and associated showing agent "R").

Figure 2:
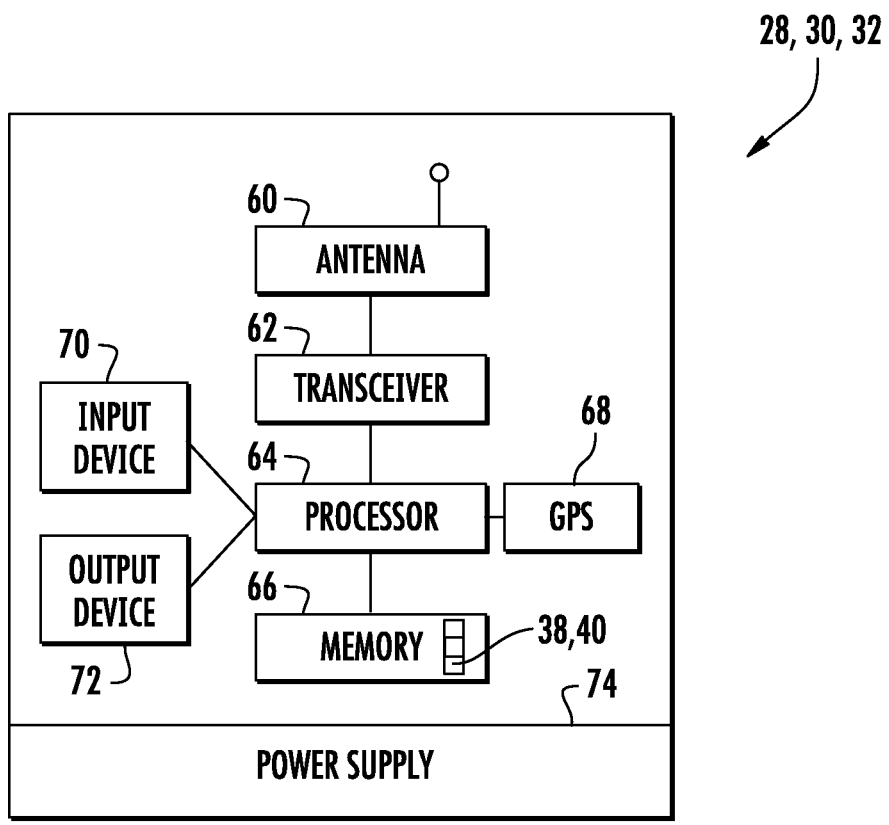
FIG. 2 is a schematic diagram of a handheld device.

With reference to FIG. 2, each handheld device 28, 30, 32, generally includes a handheld device antenna 60, a handheld device transceiver 62, a handheld device processor 64, a handheld device memory 66, a GPS module 68, an input device 70, a display 72, and a handheld device power supply 74. The handheld device processor 64 may be any type of microprocessor having desired performance characteristics. The handheld device memory 66 may include any type of computer readable medium that stores the data and executable instructions described herein below. The executable instructions may be stored or organized in any manner and at any level of abstraction, such as in connection with one or more applications, processes, routines, procedures, methods, etc. The handheld device transceiver 62 is a transceiver of a type corresponding to the transceiver 62 and the handheld device antenna 60 is a corresponding antenna.

Figure 3:
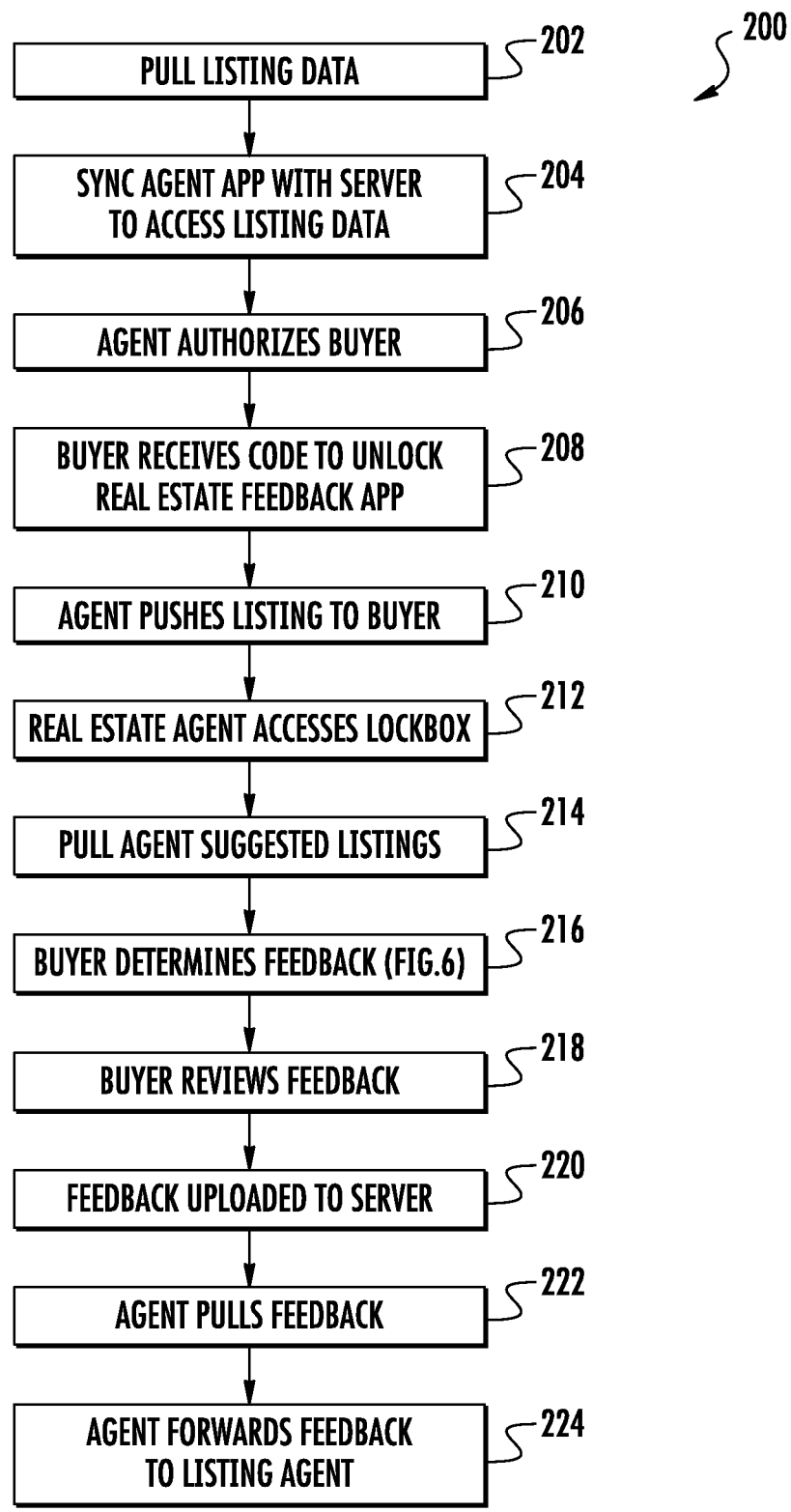
FIG. 3 is a flowchart of a method to provide feedback for real estate, with the system of FIG. 1.

With reference to FIG. 3, a method 200 for operation of the system 10 is disclosed in terms of functional block diagrams. The functions are programmed software routines capable of execution in various microprocessor based electronics control embodiments and represented herein as block diagrams.

Initially, the owner of the subsystem 12 may have agreements with MLS to selectively extract (202) MLS data from the external data servers 26A-26N (FIG. 1) into the listing recommendation server 14. Next, the agent application 40 syncs (204) with the listing recommendation server 14 and pulls MLS data for desired listings. This may be performed through an automated sync through the agent application 40. The showing agent "R" may also do a manual sync to obtain updated MLS data.

Through the agent application 40, the showing agent "R" can authorize (206) the home buyer "B" to access the desired listings of interest to the buyer "B". Through the agent application 40, the showing agent "R" authorizes the buyer "B" through input of buyer identification information (e.g., name and email address.) The buyer identification information is then synced with the listing recommendation server 14. The listing recommendation server 14 then communicates with the buyer "B" (e.g., via email) that can include a link to an app store and a code to unlock (208) the real estate application 38. The buyer "B" is then authorized to download the real estate application 38 and desired listings, or to maintain the value of the showing agent "R" in the real estate transaction.

Figure 4:
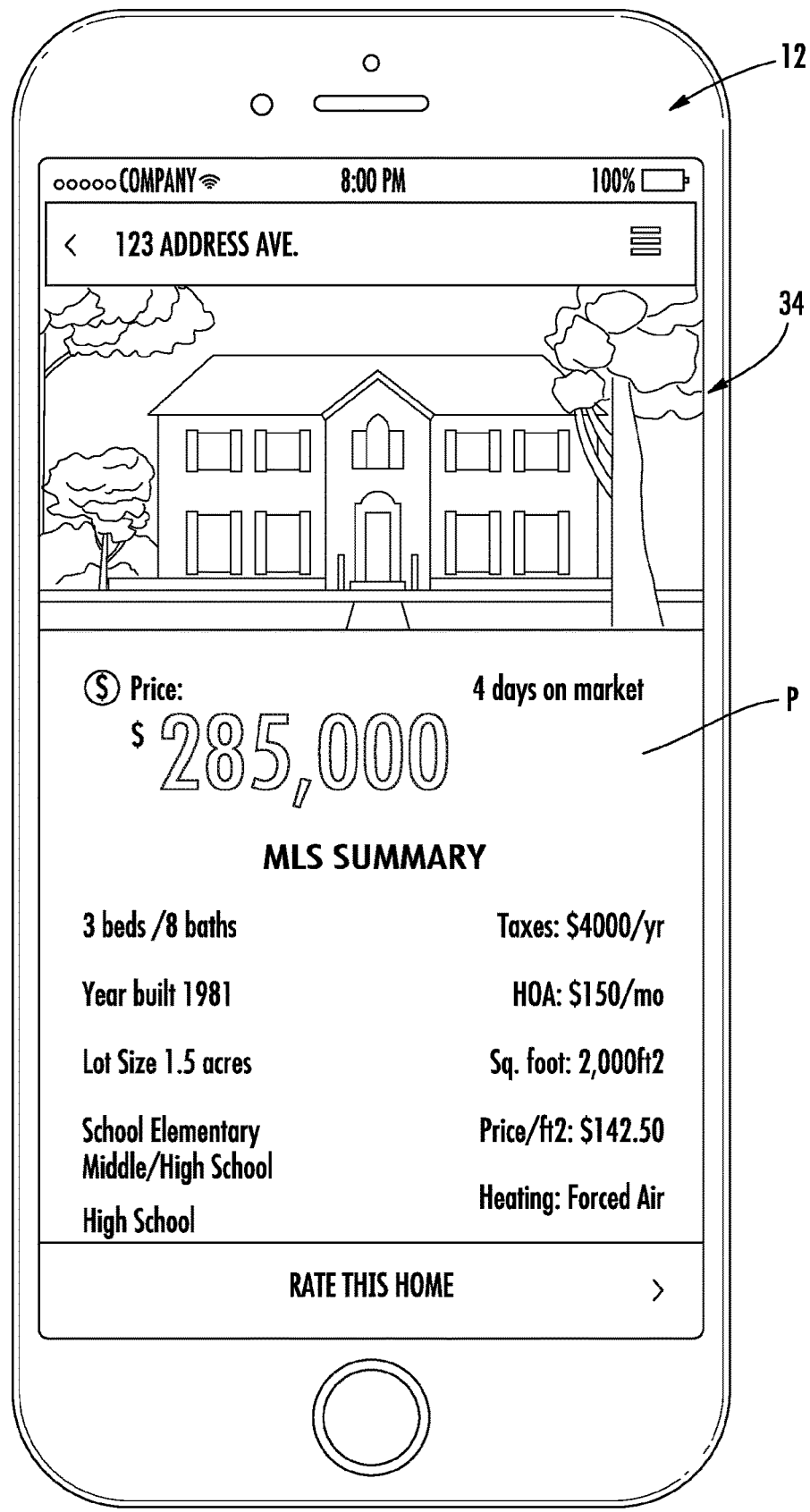
FIG. 4 is a screenshot of the real estate feedback application property listing view.

Through the agent application 40, the showing agent "R" can continue to push (210) listings to the real estate application 38. Access may be provided for one or more properties by a showing code, or other link to unlock one or more features in the real estate application 38. The showing agent "R" is able to selectively push properties (one example property illustrated by screenshot "P"; FIG. 4) to be viewable within the real estate application 38. The showing agent "R" also uses the agent application 40 to operate the electronic key box 50 to access the property for showing to the buyer "B."

Figure 5:
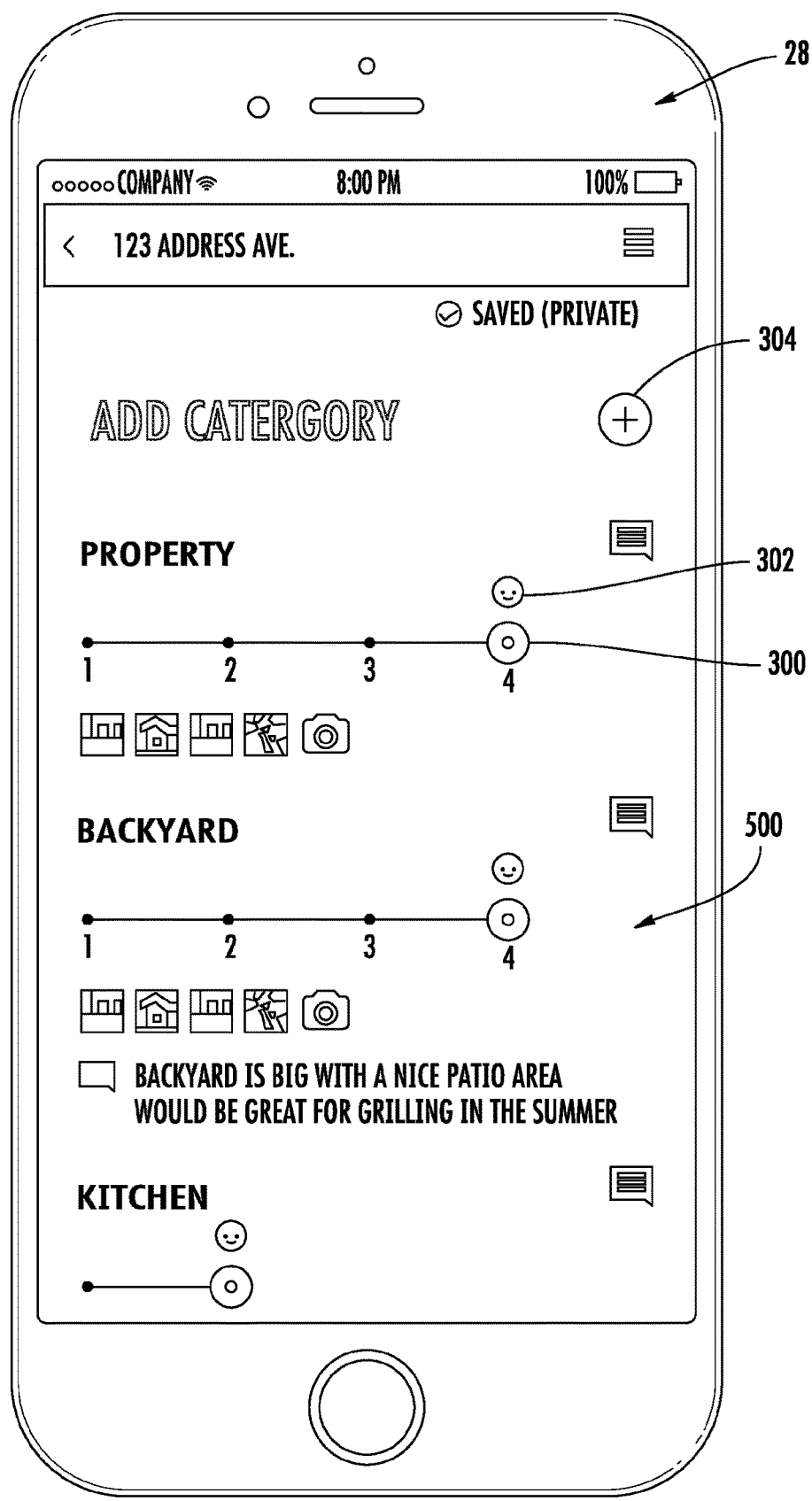
FIG. 5 is a screenshot of the real estate feedback application feedback view.
Figure 6:
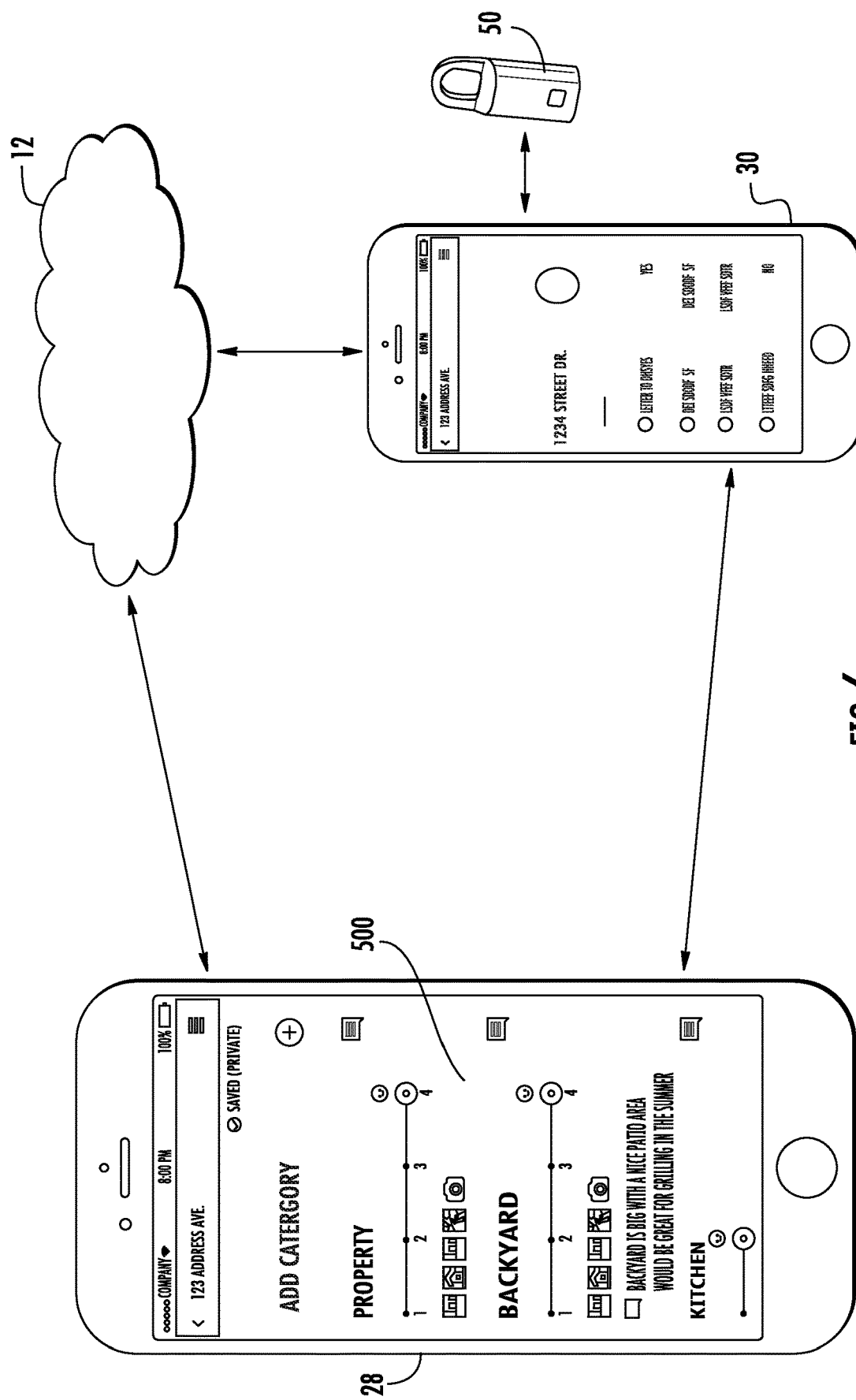
FIG. 6 is a schematic diagram of a system to provide feedback for real estate which is a portion of the system of FIG. 1.

Next, during the showing, feedback is entered into the real estate feedback application 500 by the buyer "B" for the property (step 216; FIG. 5 and FIG. 6) as further discussed below. The feedback may include any data that can be later used for reviewing and comparing properties. The real estate feedback application 500 may be a module of the real estate application 38, and/or other application.

In addition to the features discussed above, the buyer "B" can utilize the real estate feedback application 500 to record feedback for each property visited. In one embodiment, the buyer "B" can take pictures, videos, and/or notes during the property showing. In another embodiment, the feedback may be provided as a scale rating (FIG. 5). For example, the scale rating may be numeric 300 (e.g., 1-10), emoji based 302 (e.g., happy face, sad face), color coded (e.g., red, yellow, green), or other such ranking. Further, the rating may be specific to particular rooms of the property, (e.g., property, backyard, kitchen, etc.) and/or features, (e.g., appliances, fixtures, etc.). In another embodiment, the buyer is prompted for feedback. In another embodiment, the buyer is prompted for feedback based on the location of the buyer within the property (e.g., via global positioning of the buyer within the property by way of the GPS module 68 (FIG. 2)) such that when the buyer enters, for example, the kitchen, the real estate feedback application 500 prompts the buyer for feedback on the kitchen, etc. In still another embodiment, the buyer can add a category 304 to provide feedback thereon (e.g., garage).

The feedback is then saved in memory 66 (FIG. 2) via the real estate feedback application 500 so that the buyer can review at a later time (step 218). The feedback can also be used to compare properties reviewed by the buyer.

As the buyer generates feedback about the listing, the real estate feedback application 500 uploads this data to the buyer API 20 (step 220; FIG. 1). Once the showing is complete, the buyer can decide to share the ratings with their showing agent "R" via the real estate feedback application 500 which authorizes the listing recommendation server to release the ratings 14 from the buyer database 19.

The agent application 40 then syncs with the listing recommendation server 14 and downloads the feedback (step 222). The showing agent "R" is then able to review ratings and comments on the agent application 40.

Through the agent application 40, the showing agent "R" can communicate the feedback to the listing agent "L" (step 224). In one embodiment, the feedback may be forwarded through an email app on the handheld device 30, and need not be through the subsystem 12. For example, an email app resident on the handheld device 30 is called by the agent application 40, and the feedback is automatically copied into the email body. The showing agent "R" may then edit the email body prior to sending the feedback to the listing agent "S."

Figure 7:
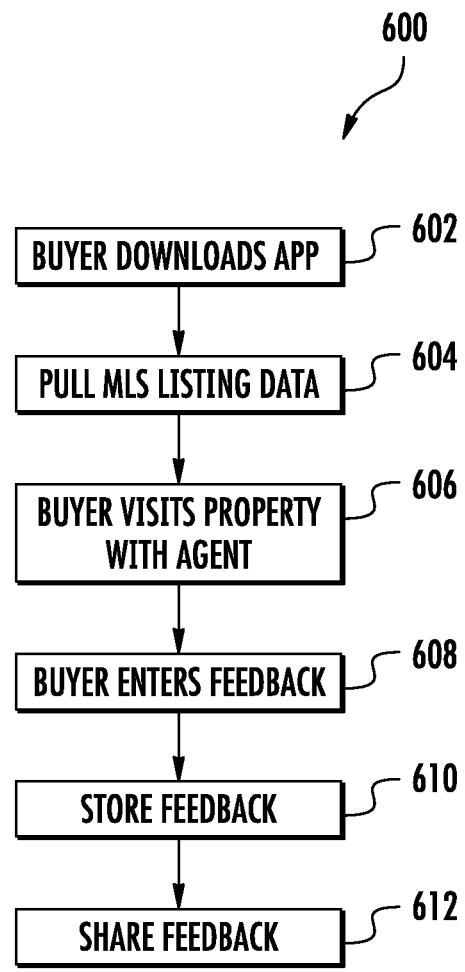
FIG. 7 is a flowchart to provide feedback from a buyer's handheld device.

With reference to FIG. 7, a method 600 for providing feedback via the real estate feedback application 500 from the perspective of the buyer "B" is disclosed in terms of functional block diagrams. The functions are programmed software routines and executable instructions capable of execution in various microprocessor based electronics control embodiments and represented herein as block diagrams.

Initially, the buyer "B" downloads the real estate feedback application 500 from a source such as an app store (step 602). The real estate feedback application 500 communicates (step 604) with the listing recommendation server 14 via the buyer API 34 to pull the agent selected MLS listings. The showing agent "R" then typically escorts the buyer "B" for a showing of particular properties selected by the buyer (step 606). Next, the feedback is entered (step 608; FIG. 5) into the real estate feedback application 500 by the buyer "B" for the particular property. The feedback is then saved via the real estate feedback application 500 so that the buyer "B" can review at a later time (step 610). The real estate feedback application 500 can be used by the buyer "B" to review feedback and compare notes on the properties.

Figure 8:
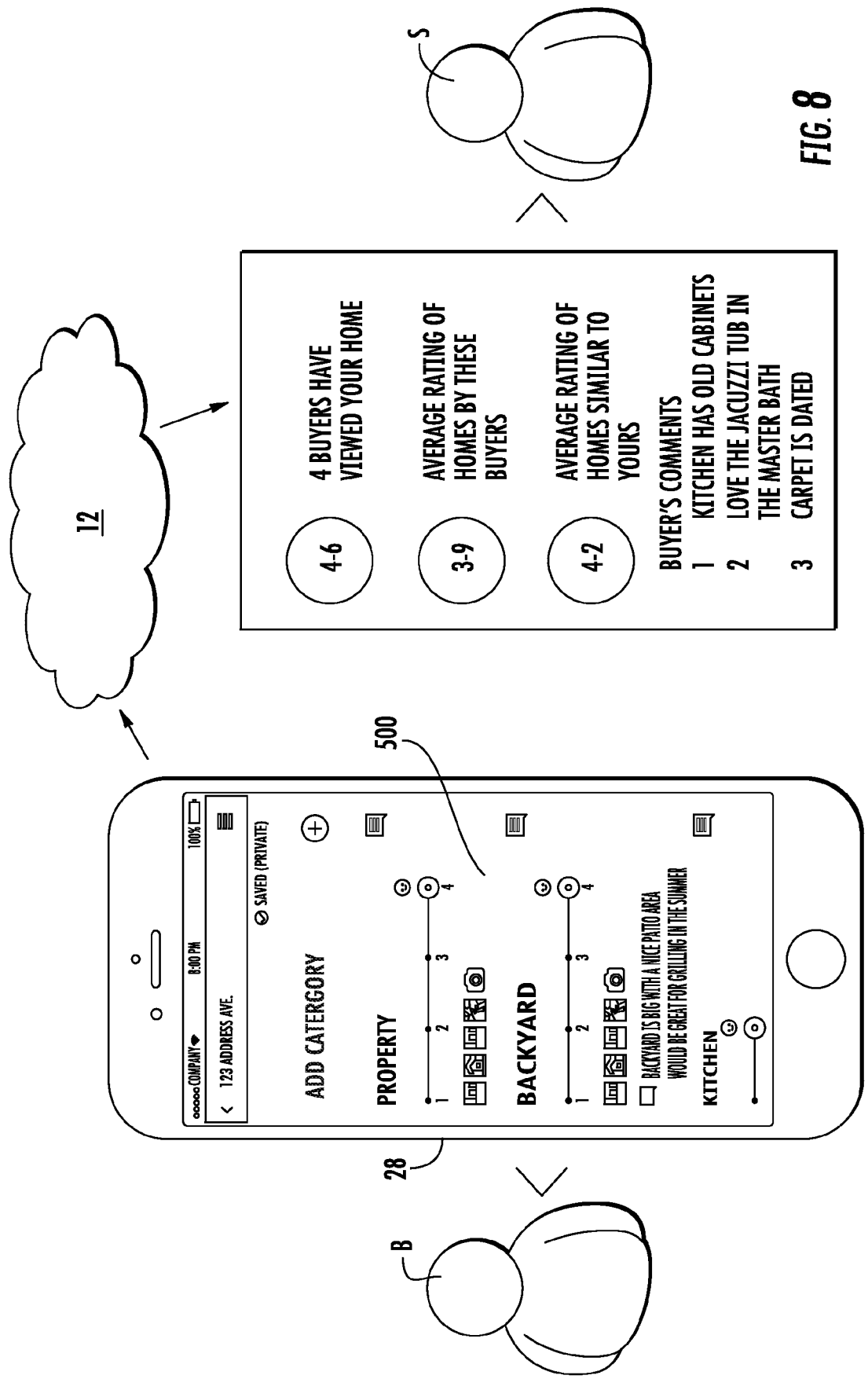
FIG. 8 is a schematic block diagram of feedback provided from a buyer's handheld device to a seller.

Once the showing is complete, the buyer can choose to share the ratings with their showing agent "R" (step 612). If they choose to do so, the real estate feedback application 500 will send a message to the listing recommendation server 14 though the buyer API 20 to release the ratings to the showing agent "R." The feedback may be provided to the listing agent "L" through the subsystem 12. In this embodiment, the real estate feedback application 500 uploads the feedback data from the buyer database 18 to the electronic key server 22 via the buyer API 34 which then generates a report for the listing agent "L" (FIG. 8). The report may include the feedback in a format that may include, but not be limited to, this particular buyer's feedback (i.e., does the buyer like the property?), this particular buyer's feedback as compared to other properties (i.e., how serious is the buyer about the property?), other buyer's feedback comparison for the particular property (i.e., is this a likely buyer?) and/or other buyer's feedback for other properties (i.e., how does the particular property compare with other properties?)

The system and method provides a seller with access to relevant buyer feedback and buyers with a tool for managing properties they visit.

The elements described and depicted herein, including in flow charts and block diagrams throughout the figures imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method to provide feedback associated with a real estate listing, comprising:
   providing access to a real estate listing via a system including at least a listing recommendation server that communicates with a real estate feedback application;
   receiving feedback regarding the real estate listing from a handheld device operating the real estate feedback application, wherein the receiving feedback step comprises monitoring, via a global positioning system (GPS), a location of the handheld device within a property corresponding to the real estate listing;
   prompting a user of the handheld device to enter feedback specific to a room of the property when the location of the handheld device enters the room of the property; and
   sharing the feedback with a showing agent associated with the real estate listing.

2. The method as recited in claim 1, wherein the providing access to the real estate listing is selectively provided in response to direction from the showing agent associated with the real estate listing.

3. The method as recited in claim 1, wherein the receiving feedback regarding the real estate listing includes receiving at least one of a picture, a video, and a note from the handheld device running the real estate feedback application.

4. The method as recited in claim 1, wherein the receiving feedback regarding the real estate listing includes receiving a rating from the handheld device operating the real estate feedback application.

5. The method as recited in claim 4, wherein the rating is provided as a scale rating.

6. The method as recited in claim 5, wherein the scale rating is provided as at least one of numeric, emoji based, and color coded.

7. The method as recited in claim 6, wherein the scale rating is specific to particular rooms of the property.

8. The method as recited in claim 1, wherein the sharing the feedback with the showing agent associated with the real estate listing includes sharing the feedback to a handheld device of the showing agent via the Internet through the listing recommendation server.

9. The method as recited in claim 8, further comprising selectively sharing the feedback from the showing agent to a handheld device of a listing agent of the property via the Internet through the listing recommendation server.

10. The method as recited in claim 1, wherein the step of prompting the user of the handheld device to enter feedback specific to the room happens when the global positioning system (GPS) detects the handheld device in the room.

11. A method to provide feedback associated with a real estate listing, comprising:
receiving access to a real estate listing on a real estate feedback application operating on a handheld device;
recording feedback regarding the real estate listing via the real estate feedback application, wherein the recording feedback step comprises receiving a prompt to enter feedback specific to a room at a property corresponding to the real estate listing when the handheld device enters the room, and entering the feedback; and
communicating the feedback from the real estate feedback application to a showing agent associated with the real estate listing via a system including at least a listing recommendation server.

12. The method as recited in claim 11, wherein the receiving access to the real estate listing is received from the agent associated with the real estate listing.

13. The method as recited in claim 11, wherein the recording feedback regarding the real estate listing includes storing a picture from the handheld device running the real estate feedback application.

14. The method as recited in claim 11, wherein the recording feedback regarding the real estate listing includes storing video from the handheld device running the real estate feedback application.

15. The method as recited in claim 11, wherein the recording feedback regarding the real estate listing includes storing a note from the handheld device running the real estate feedback application.

16. The method as recited in claim 11, wherein the recording feedback regarding the real estate listing includes a rating from the handheld device operating the real estate feedback application.

17. The method as recited in claim 16, wherein the recording feedback regarding the real estate listing includes storing feedback associated with a specific area of the property associated with the real estate listing.

18. The method as recited in claim 16, wherein the rating is provided as a scale rating.

19. The method as recited in claim 18, wherein the scale rating is provided as at least one of numeric, emoji based, and color coded.

20. The method as recited in claim 19, wherein the scale rating is specific to particular rooms of the property.

21. The method as recited in claim 20, wherein the showing agent selectively defines the feedback which is communicated with the listing agent.

22. The method as recited in claim 20, wherein the listing recommendation server generates a report for the listing agent, the report includes at least one of a particular buyer's feedback, a particular buyer's feedback as compared to other properties, other buyer's feedback comparison for the particular property, and other buyer's feedback for other properties.

23. The method as recited in claim 11, wherein the communicating the feedback with the agent associated with the real estate listing includes communicating the feedback to a handheld device of the showing agent via the Internet through the listing recommendation server.

24. The method as recited in claim 23, further comprising selectively communicating the feedback from the showing agent to a handheld device of a listing agent of the property via the Internet through the listing recommendation server.

25. The method as recited in claim 11, wherein the handheld device is detected entering the room by global positioning system (GPS).

26. A handheld device, comprising:
a power supply;
a memory to store executable instructions for operation of a real estate feedback application; and
a processor in communication with the memory and the power supply, the processor operable to execute the executable instructions to record feedback regarding a real estate listing via the real estate feedback application, then communicating the feedback from the real estate feedback application, wherein the recording feedback regarding the real estate listing includes receiving a prompt to enter feedback specific to a room at a property corresponding to the real estate listing when the handheld device is detected in the room, and storing feedback associated with the room in memory via the real estate feedback application, the room of the property determined by a GPS module in the handheld device.

27. The handheld device as recited in claim 26, wherein the executable instructions include executable instruction to display the feedback as a rating scale on a display of the handheld device.

28. The handheld device as recited in claim 26, wherein the rating is provided as a scale rating.

29. The handheld device as recited in claim 28, wherein the scale rating is displayed as at least one of numeric, emoji based, and color codes.

30. The handheld device as recited in claim 26, wherein the communicating the feedback from the real estate feedback application further comprises communicating the feedback to a handheld device of a listing agent via the Internet through a listing recommendation server.

* * * * *